United States Patent [19]

Kobayashi et al.

[11] Patent Number: 5,896,389

[45] Date of Patent: Apr. 20, 1999

[54] COMPOUND TRANSMISSION SYSTEM FOR COMPOUNDING LAN AND OTHER COMMUNICATION CHANNELS

[75] Inventors: Yoshikazu Kobayashi; Tatsuya Kato, both of Tokyo, Japan

[73] Assignee: NEC Corporation, Tokyo, Japan

[21] Appl. No.: 08/621,195

[22] Filed: Mar. 21, 1996

[30] Foreign Application Priority Data

Mar. 27, 1995 [JP] Japan ................................. 7-066615

[51] Int. Cl.$^6$ ................................................. H04M 7/00
[52] U.S. Cl. ................... 370/527; 370/529; 340/310.07; 455/3.3
[58] Field of Search ................................. 370/434, 463, 370/527, 529; 340/310.01, 310.07; 455/3.3; 375/257, 258

[56] References Cited

U.S. PATENT DOCUMENTS 4,569,045 2/1986 Schieble et al. .................... 370/527
5,148,144 9/1992 Sutterlin et al. ................ 340/310.01

OTHER PUBLICATIONS

Local and Metropolitan Area Networks—8029, published by the Institute of Electrical and Electronics Engineers, Inc., Dec. 30, 1994, pp. 29–58.

Primary Examiner—Chi H. Pham
Assistant Examiner—Ricky Ngo
Attorney, Agent, or Firm—Sughrue, Mion, Zinn, Macpeak & Seas, PLLC

[57] ABSTRACT

A compound transmission system compounds signals from a LAN communication device and other communication devices without multiplex them. A first LAN communication device is connected to a second LAN communication device through two line pairs (10, 20). A first signal transmission device such as an exchanger (111) is connected to center taps of windings of transformers (50, 51) on the side of the line pairs to superpose a communication signal from the first signal transmission device on the LAN signal and separate a telephone communication signal from the LAN signal at the center taps. The transformers (50, 51) constitute a first superpose/separate circuit. A second signal transmission device such as an exchanger terminal (112) is connected to center taps of windings of transformers (60, 61) on the side of the line pairs to superpose a communication signal from the second signal transmission device on the LAN signal and separate the communication signal from the LAN signal at the center taps. The transformers (60, 61) constitute a second superpose/separate circuit.

11 Claims, 6 Drawing Sheets ically, to a compound transmission system for com-

5,896,389

COMPOUND TRANSMISSION SYSTEM FOR COMPOUNDING LAN AND OTHER COMMUNICATION CHANNELS

BACKGROUND OF THE INVENTION

1. Field of the Invention

The present invention relates to a technology for compounding a LAN (Local Area Network) communication channel and other communication channels and, particularly, to a compound transmission system for compounding and transmitting signals of a LAN communication channel and other telephone communication channels or other data communication channels without using a frame or time-division multiplex technique.

2. Description of the Related Art

It has been usual that a LAN communication channel and a communication channel of another communication system are provided separately from each other. Recently, however, a technology by which a LAN signal on a LAN communication channel and a signal on a communication channel of another communication system are frame-multiplexed by using a time-division multiplex technique and transmitted through a single transmission path is becoming popular. For example, IEEE802.9 defines a technology for compounding communication channels of a LAN communication system and a telephone exchanger by using a time-division frame-multiplex.

Signals to be multiplexed by a multiplex communication device according to the IEEE802.9 definition have 2B+D+P frame structures and a LAN signal is transmitted in the P frame after converted into packet data and an exchange signal used for a communication of the telephone exchanger is transmitted in the B frame. Therefore, the exchanger requires a trunk dedicated to the 2B+D+P frame structure and the LAN communication system requires a special device referred to as "access unit" as an interface for a communication path of the 2B+D+P frame signal.

In the conventional multiplex communication device mentioned above, frame transforming adapters, for multiplexing the LAN signal from the LAN communication system and a communication signal from the exchanger by using the dedicated 2B+D+P frame structures, are required at a transmitting side. Also, at the receiving side, the dedicated frames received by the LAN communication system and the exchanger on the other side are demultiplexed by frame transforming adapters to recover the LAN signal and the telephone communication system. Therefore, the conventional multiplex transmission system is very expensive and, since the 2B+D+P frames dedicated to the respective LAN communication system and the exchanger are used, a maintenance of the communication system is difficult and there may be considerable communication delay.

SUMMARY OF THE INVENTION

An object of the present invention is to provide a signal compound transmission system which transmits a LAN signal and a signal from an exchanger or another LAN communication device by merely superposing them without using the time-division and frame-multiplex.

In order to achieve the above object, the signal compound transmission system according to the present invention compounds a LAN signal to be transmitted between a first LAN communication device and a second LAN communication device and a communication signal to be transmitted between a first signal transmission device and a second signal transmission device, and transmits a resultant compounded signal via two pairs of lines. The two pairs of lines are connected between the first LAN and second LAN communication devices through transformers and transmit a LAN signal. The first LAN communication device is connected to ends of the two line pairs through first transformers and the second LAN communication device is connected to the other ends of the two line pairs through second transformers.

A first superpose/separate circuit superposes the communication signal from the first signal transmission device on the LAN signal transmitted on the two line pairs at first intermediate level points connected to the first transformers on the side of the two line pairs, and separates the communication signal from the first intermediate level point. Each of the first intermediate level points is a connection point having a half of a terminal voltage applied to the first transformer. A second superpose/separate circuit superposes the communication signal from the second signal transmission device on the LAN signal at second intermediate level points connected to the second transformers on the side of two line pairs, and separate the communication signal from the second intermediate level point. Each of the second intermediate level points is a connection point having a half of a terminal voltage applied to the second transformer.

Therefore, when the communication signals from the first and second signal transmission devices are applied to the first and second intermediate level points, they are divided to the terminals of each of the first and second transformers as opposite phase signals to be interrupted. Thus, the communication signals are not detected at the first and second LAN communication devices, and, similarly, the LAN signal is not detected at the first and second signal transmission devices.

In the compound transmission system according to the present invention, the first superpose/separate circuit superposes the communication signal from the first signal transmission device on the LAN signal on each of the two line pairs as a common-mode component and separates the communication signal as the common-mode component signal. Further, the second superpose/separate circuit superposes the communication signal from the second signal transmission device on the LAN signal on each of the two line pairs as a common-mode component and separates the communication signal as the common mode component signal.

When the first and second superpose/separate circuits are constituted with transformers, the intermediate level points are center taps of windings thereof on the side of the line pairs. Alternatively, the intermediate level points may be junction points connected by a capacitor circuit or a inductance circuit provided between lines of each line pair.

Further, the first and second signal transmission devices may be a third and fourth LAN communication devices. In such case, a LAN signal transmitted between the third and fourth LAN communication devices is superposed on the LAN signal transmitted between the first and second LAN communication devices at the intermediate level points of the first and second superpose/separate circuits. Therefore, it contributes to a reduction of the transmission paths.

3

Figure 3:
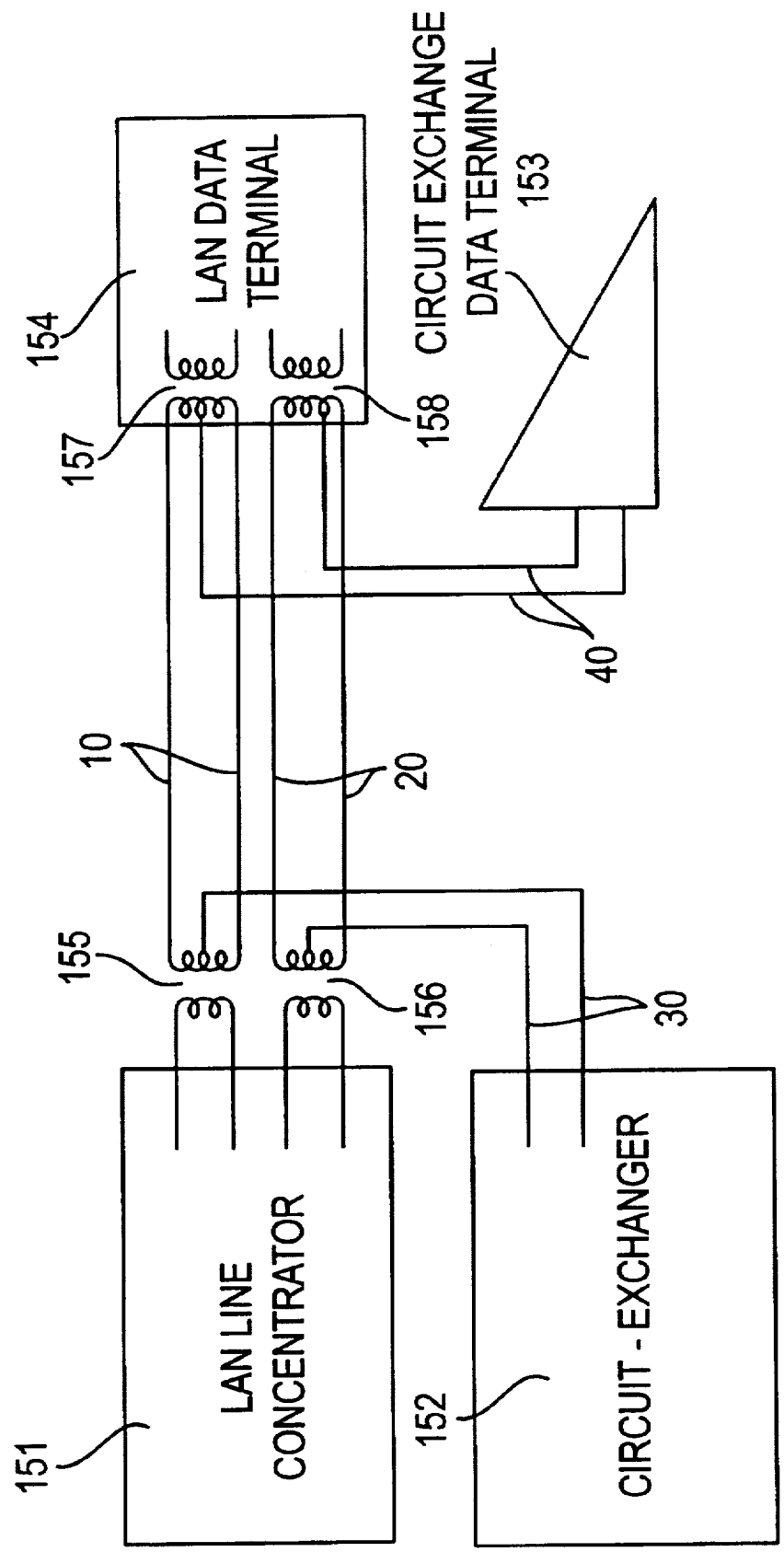
Figure 4:
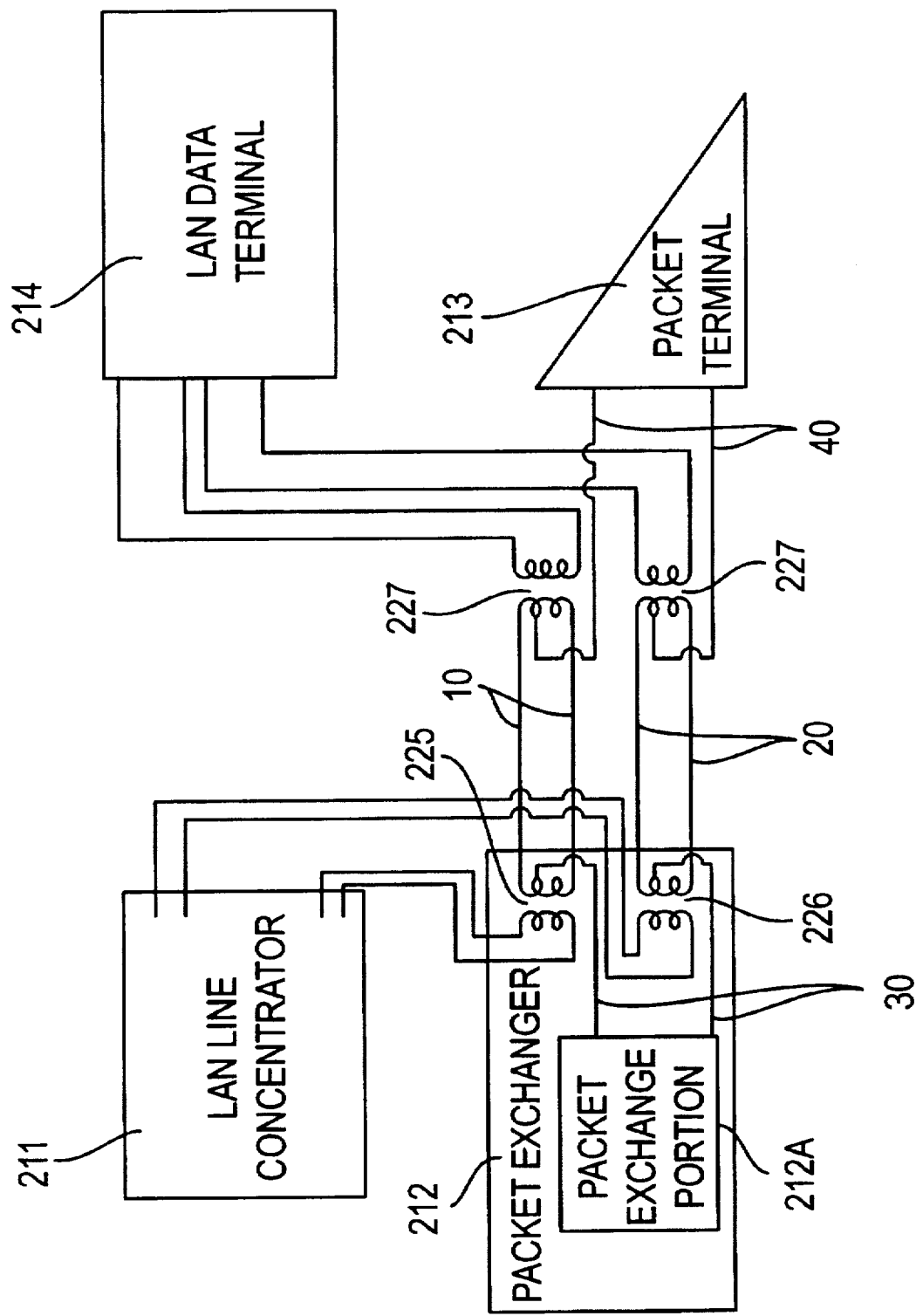
Figure 5:
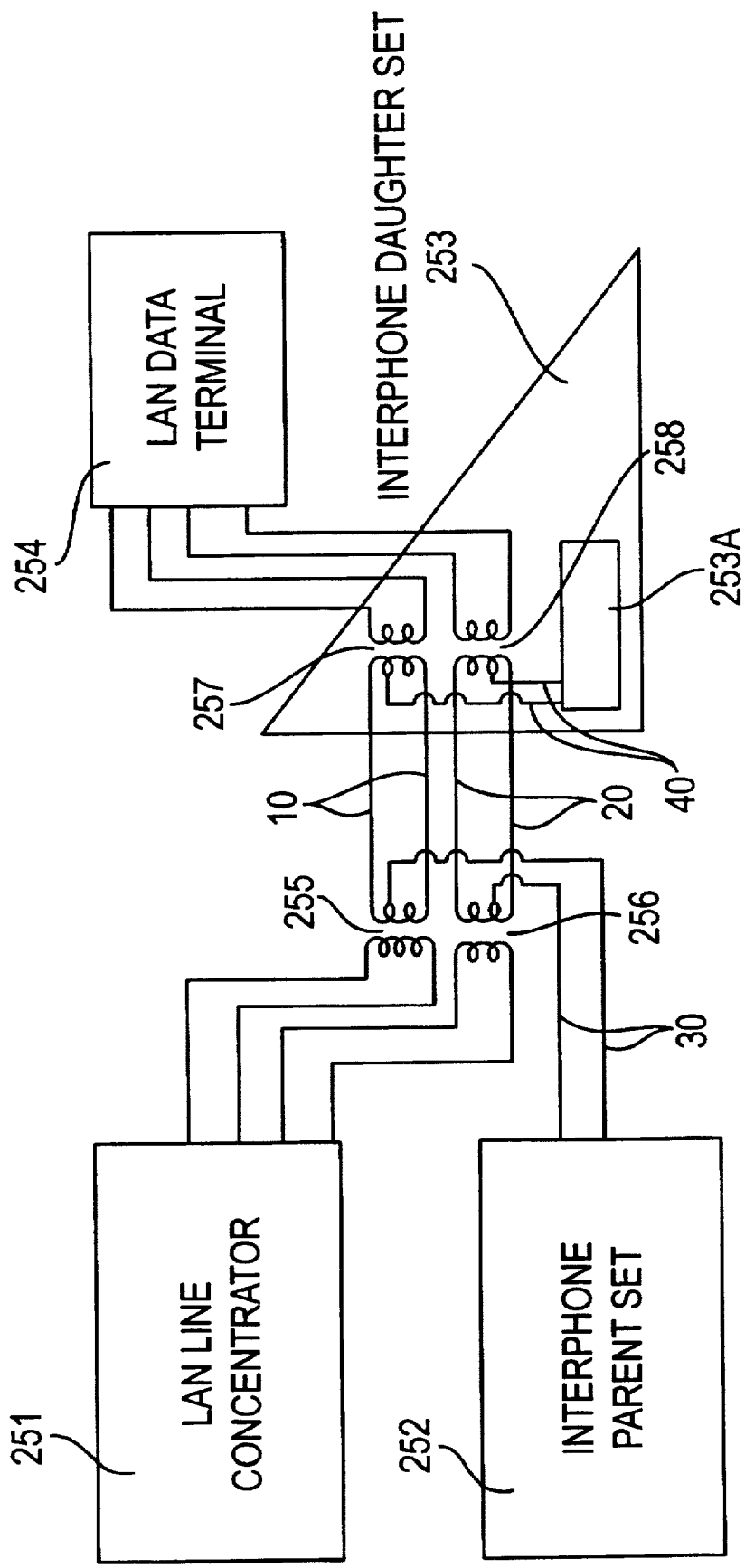
Figure 6:
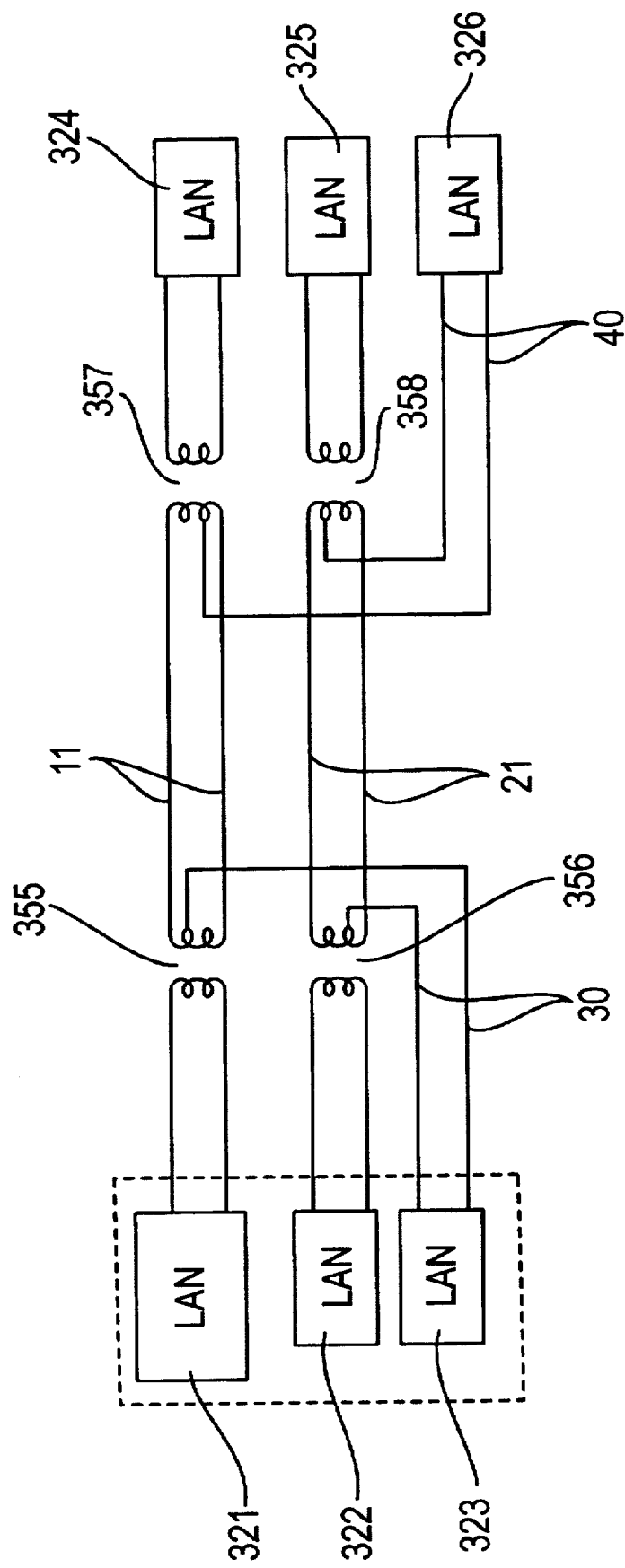

FIG. 3 is a block diagram showing a compound transmitter according to a third embodiment of the present invention;

FIG. 4 is a block diagram showing a compound transmitter according to a fourth embodiment of the present invention;

FIG. 5 is a block diagram showing a compound transmitter according to a fifth embodiment of the present invention; and FIG. 6 is a block diagram showing a compound transmitter according to a sixth embodiment of the present invention.

DETAILED DESCRIPTION OF THE PREFERRED EMBODIMENT

Figure 1:
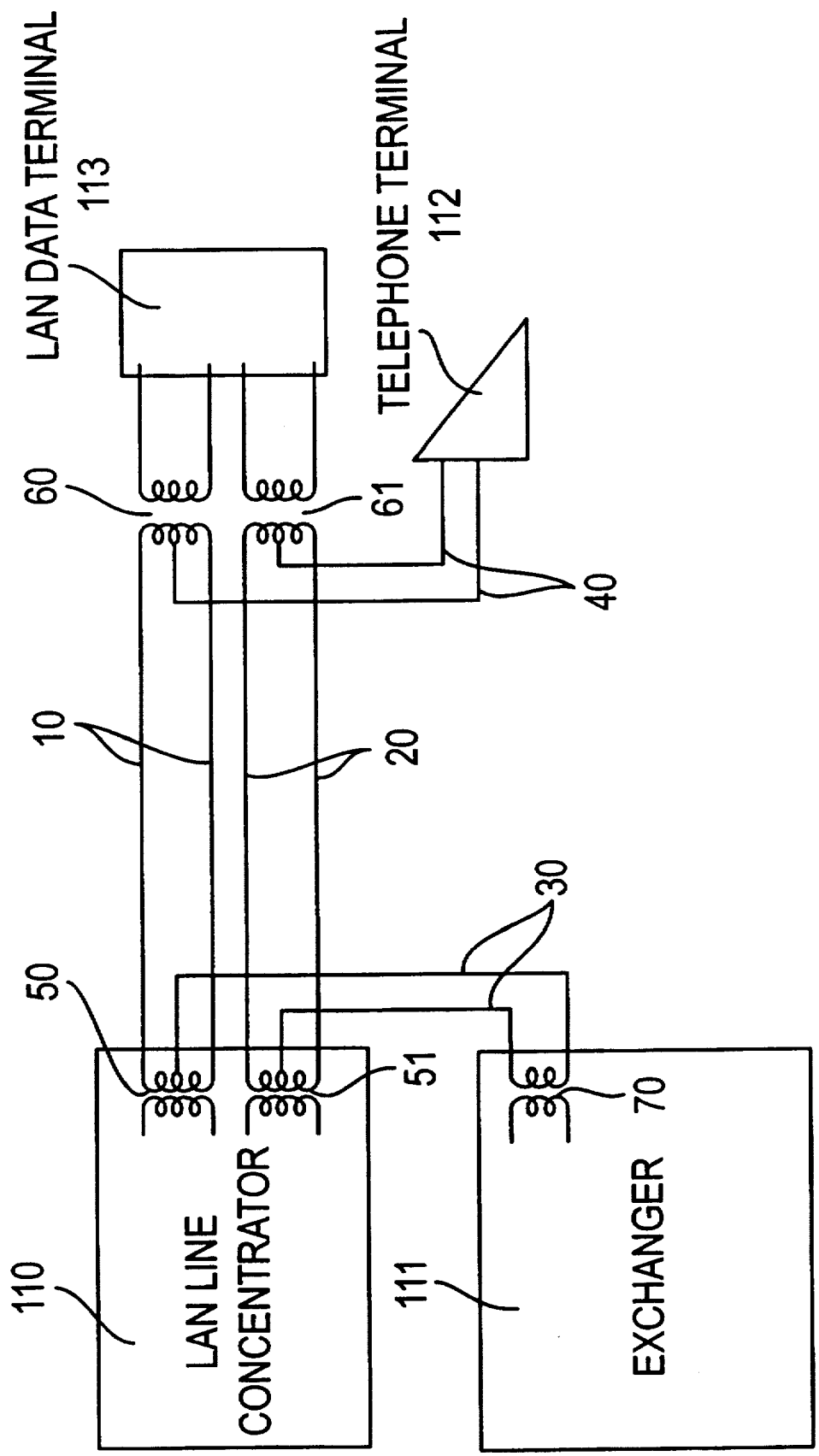
FIG. 1 is a block diagram showing a compound transmitter according to a first embodiment of the present invention.

In FIG. 1, a LAN line concentrator 110 as a first LAN communication device performs a communication by using a LAN signal (digital signal) defined by IEEE802 or ANSY-X3. The LAN line concentrator 110 is connected to a LAN data terminal 113 as a second LAN communication device through first line pairs 10 and 20. The line pair 10 constitute a transmission path and the line pair 20, a receiving path of the LAN signal. The impedance of the line pair 10 is equal to that of the line pair 20. The LAN line concentrator 110 functions to distribute a LAN signal from a LAN data processor (not shown) to a plurality of LAN data terminals or to receive LAN signals from the plurality of LAN data terminals and output them to the LAN data processor. The LAN line concentrator 110 can connect a plurality of LAN data terminals as mentioned above. However, for simplicity of description, only one LAN data terminal 113 will be described here as to be connected to the LAN line concentrator.

Transformers 50 and 51 which constitute a first superpose/separate circuit are provided in the LAN line concentrator 110 and have windings connected to one ends of the first line pairs 10 and 20. Transformers 60 and 61, which constitute a second superpose/separate circuit, have windings connected to the other ends of the line pairs 10 and 20, and wirings connected to the LAN data terminal 113. Although the transformers 50 and 51 are provided in the LAN line concentrator 110, the transformers 60 and 61 are provided separately from the LAN data terminal 113.

A telephone exchanger 111 which constitutes a first signal transmission device is connected to the transformers 50 and 51 through a transformer 70 and a second line pair 30. Lines of the second line pair 30 from the exchanger 111 are connected to first intermediate level points of the windings of the transformers 50 and 51 on the side of the line pairs 10 and 20. Voltages at the first intermediate level points are halves of terminal voltages of the secondary windings of the transformers 50 and 51. In this embodiment, the first intermediate level points are center taps of the secondary windings of the transformers 50 and 51. With this connection, telephone communication signals from the exchanger 111 which are composed of a circuit exchange data component and a D.C. component are superposed on the first line pairs 10 and 20, and signals from the LAN DATA terminal 113 are separated from a transmission signal on the line pairs 10 and 20 to the exchanger 111.

A telephone terminal 112 which constitutes a second signal transmission device is connected to windings of transformers 60 and 61 on the side of the line pairs 10 and 20 through a third line pair 40. In this case, lines of the second line pair 40 from the telephone terminal 112 are connected to second intermediate level points of the windings of the transformers 60 and 61. Voltages at the second intermediate level points are halves of terminal voltages of

4 the secondary windings of the transformers 60 and 61. In this embodiment, the second intermediate level points are center taps of the windings of the transformers 60 and 61. With this connection, telephone communication signals from the telephone terminal 112 which are composed of a circuit exchange data component and a D.C. component are superposed on the LAN signal transmitted through the first line pairs 10 and 20, and the telephone communication signals from the exchanger 111 are separated from the transmission signal on the line pairs 10 and 20 to the telephone terminal 112.

As mentioned above, the telephone communication signal are superposed on the LAN signal by the connections of the exchanger 111 and the telephone terminal 112 to the center taps of the transformers 50, 51 and 60, 61 connected to the respective ends of the first line pairs 10 and 20, and the telephone communication signals are separated from the transmission signal transmitted on the line pairs 10 and 20 at the center taps of these transformers. In this case, the telephone communication signals from the exchanger 111 and the telephone terminal 112 are superposed as common-mode component signals on the LAN signal on the first line pairs 10 and 20, and the LAN signal and the telephone communication signal superposed thereon are transmitted without frame multiplex. Since the telephone communication signals are transmitted between the line pairs 10 and 20 as common-mode components and they are applied to the windings of each of the transformers 50, 51, 60 and 61 as opposite phase signals, the telephone communication signals are not derived from the LAN line concentrator 110 and the LAN data terminal 113.

It may be possible to use another LAN line concentrator instead of the LAN data terminal 113 and connect the LAN line concentrators at both ends of the line pairs 10 and 20. Further, the telephone terminal 112 may be an analog telephone terminal or a digital telephone terminal. Further, it is possible to perform a telephone exchanging relay between exchangers by using an exchanger and an exchange trunk connection instead of the telephone terminal 112. Further, it is possible to use a television conference device and its terminals, instead of the exchanger 111 and the telephone terminal 112. Further, the telephone terminal 112 is not limited to a 2-wire telephone device and it is possible to use a 4-wire telephone device. In the latter case, transmission lines from the 4-wire telephone device are connected to the first line pairs 10 and 20 and the receiving lines from the 4-wire telephone device are to other two line pairs (not shown in FIG. 1) through the center taps of the transformers, respectively.

Further, although, in the compound transmitter shown in FIG. 1, the transformers 50 and 51 which constitute the first superpose/separate circuit are provided within the LAN line concentrator 110, it is possible to arrange the transformers 50 and 51 in the vicinity of the exchanger 111 and supply the LAN signal from the LAN line concentrator 110 to the transformers 50 and 51 through a coaxial cable. In the latter case, a connecting interface for connecting the coaxial cable to the 2 line pairs is required between the coaxial cable and the line pairs connected to the transformers 50 and 51.

Further, when such connecting interface is used, it is possible to connect the coaxial cable to the windings of the transformers 50 and 51, the transformers 60 and 61 and the transformer 70, all of which are on the side opposite to the 2 line pairs 10 and 20, through the connecting interface, and connect the coaxial cable to the LAN line concentrator 110, the exchanger 111, the telephone terminal 112 and the LAN data terminal 113.

Figure 2:
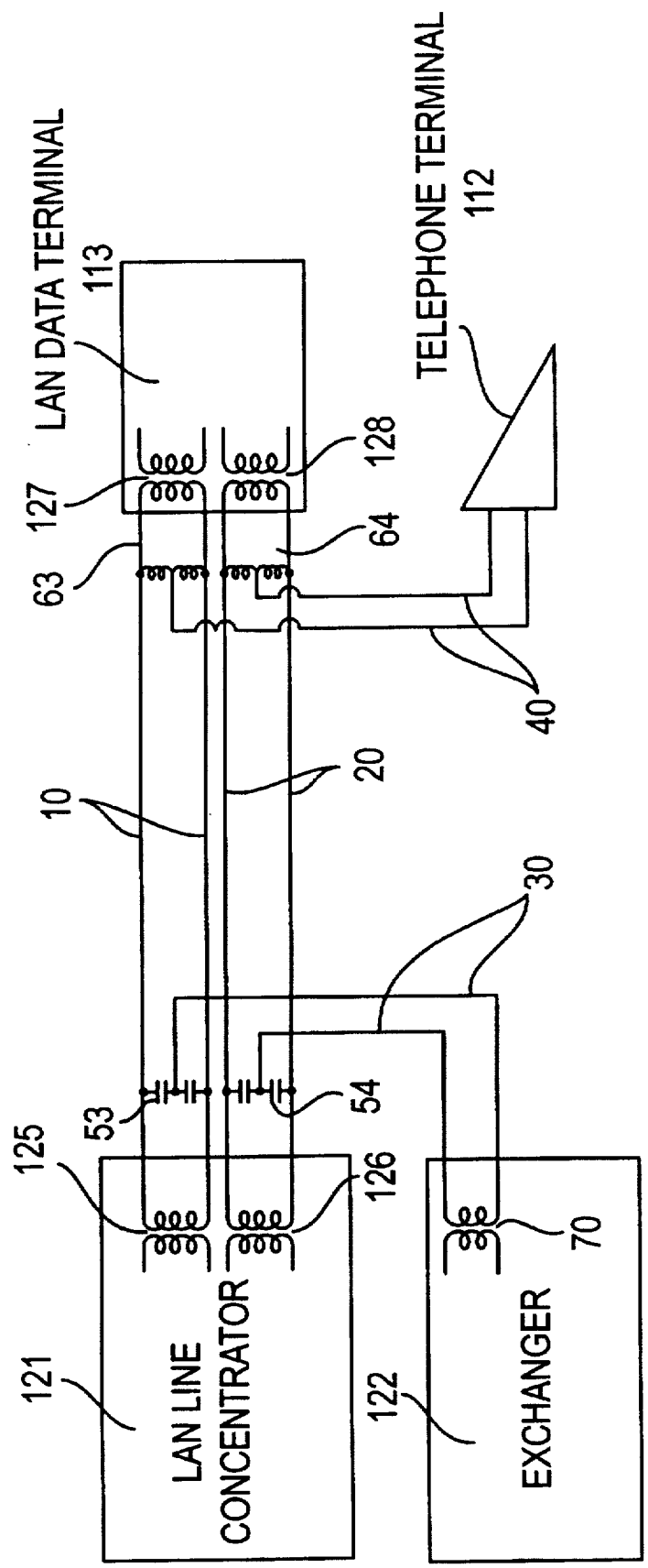
FIG. 2 is a block diagram showing a compound transmitter according to a second embodiment of the present invention.

FIG. 2 is a block diagram of a second embodiment of the present invention. In FIG. 2, a LAN line concentrator 121 and an exchanger 122 have the same functions as those of the LAN line concentrator 110 and the exchanger 111 shown in FIG. 1, respectively. The LAN line concentrator 121 and a LAN data terminal 124 are connected by the first line pairs 10 and 20. The first line pairs 10 and 20 are connected between transformers 125 and 127 and between transformers 126 and 128, respectively. The transformers 125 and 126 are provided in the LAN line concentrator 121 and the transformers 127 and 128 are provided in the LAN data terminal.

The exchanger 122 is connected to first intermediate level points on one end portions of the line pairs 10 and 20, voltages at which are halves of the terminal voltages of the line pairs. A telephone terminal 123 is connected to second intermediate level points on the other end portions of the line pairs, voltages at which are halves of terminal voltages of the respective first line pairs 10 and 20. In detail, the exchanger 122 is connected through a second line pair 30 to the first intermediate level points. The first intermediate level points are provided at a junction of a pair of series connected capacitors 53 and a junction of a pair of series connected capacitors 54. Each of the capacitors 53 and 54 has the same capacitance. The capacitors 53 and 54 constitute a first superpose/separate circuit. The telephone terminal 123 is connected through a third line pair 40 to the second intermediate level points. The second intermediate level points are provided at a junction of a pair of series connected inductance elements 63 and a junction of a pair of series connected inductance elements 64. Each of the inductance elements 63 and 64 has the same inductance. The inductance circuits 63 and 64 constitute a second superpose/separate circuit. With this connection, the telephone communication signals from the exchanger 122 are superposed on the LAN signal on the first line pairs 10 and 20 as a common-mode signal and transmitted. Similarly, the telephone communication signal from the telephone device 123, when superposed on the LAN signal on the first line pairs, becomes a common-mode signal. The telephone communication signals are transmitted between the line pairs 10 and 20 as the common-mode signal. Since the telephone communication signals are applied from the first and second intermediate level points to windings of each of the transformers 125, 126, 127 and 128 as opposite phase signal, the telephone communication signals are not derived from the LAN line concentrator 121 and the LAN data terminal 124, and they are received only at the exchanger 111 and telephone terminal 123.

The second embodiment shown in FIG. 2 is effective when the center taps of the transformers 125 to 128 can not be used. The first and second superpose/separate circuits may be constituted by resistances.

FIG. 3 is a block diagram of a third embodiment of the present invention. In FIG. 3, a LAN line concentrator 151 and a LAN data terminal 154 connected to the first line pairs 10 and 20 correspond to the LAN line concentrator 110 and the LAN data terminal 113 shown in FIG. 1.

Transformers 155 and 156 which constitute a first superpose/separate circuit are connected on one side thereof to the LAN line concentrator 151 and on the other side thereof to one ends of the first line pairs 10 and 20. Transformers 157 and 158 which constitute a second superpose/separate circuit are connected to the other ends of the line pairs 10 and 20. The transformers 157 and 158 are provided in the LAN data terminal 154.

A circuit exchanger 152 has a function of exchanging information processing data as well as audio signals. A second line pair 30 connects the circuit exchanger 152 to center taps of windings of the transformers 155 and 156 on the side of the line pairs 10 and 20, and a third line pair 40 connects the circuit exchange data terminal 153 to center taps of windings of the transformers 157 and 158 on the side of the line pairs 10 and 20.

Therefore, a circuit exchange data transmitted between the circuit exchanger 152 and the circuit exchange data terminal 153 is superposed on the LAN signal on the first line pairs 10 and 20 and separated therefrom at the center taps of the transformers 155 and 156 and the transformers 157 and 158. Thus, a compound transmission system which transmits the LAN signal and the circuit exchange data through a common communication channel without multiplex them is realized.

Although, in FIG. 3, the second superpose/separate circuit is provided within the LAN data terminal 154, its location is not limited thereto.

FIG. 4 is a block diagram of a fourth embodiment of the present invention. In FIG. 4, the fourth embodiment comprises a LAN line concentrator 211, a plurality of LAN data terminals 214, a packet exchanger 212 and a packet terminal 213.

The packet exchanger 212 includes a packet exchange portion 212A for generating packet exchange data and exchanging them and transformers 225 and 226 which constitute a first superpose/separate circuit. The packet exchange portion 212A is connected to center taps of windings of the transformers 225 and 226 on the side of line pairs 10 and 20 through a second line pair 30.

The LAN line concentrator 211 is connected to windings of the transformers 225 and 226 on the side opposite to the line pairs 10 and 20.

The packet exchange data terminal 213 is connected to center taps of windings of transformers 227 and 278 on the side of the line pairs 10 and 20 through a third line pair 40. The transformers 227 and 228 constitute a second superpose/separate circuit.

The LAN data terminal 214 is connected to windings of the transformers 227 and 228 on the side opposite to the line pairs 10 and 20.

Therefore, the packet exchange data signal is superposed on the LAN signal and separated from the transmission signal on the line pairs 10 and 20 in the respective transformers 225 and 226, and the transformers 227 and 228. Thus, a compound transmission system for transmitting the LAN signal and the packet exchange data signal without multiplex them is realized.

FIG. 5 is a block diagram of a fifth embodiment of the present invention. In FIG. 5, an interphone parent set 252 and an interphone daughter set 253 are used together with a LAN line concentrator 251 and a plurality of LAN data terminals 254.

The parent set 252 controls the daughter set 253 via the line pairs 10 and 20. The daughter set 253 includes an interphone operating circuit 253A and transformers 257 and 258 which constitute a second superpose/separate circuit.

The parent set 252 is connected to center taps of windings of the transformers 255 and 256 on the side of line pairs 10 and 20 through a second line pair 30.

The LAN line concentrator 251 is connected to windings of the transformers 255 and 256 on the side opposite to the line pairs 10 and 20.

The interphone operating circuit 253A is connected to center taps of windings of the transformers 257 and 258 on the side of the first line pairs 10 and 20 through a third line pair 40.

The LAN data terminals 254 are connected to windings of the transformers 257 and 258 on the side opposite to the line pairs 10 and 20.

Therefore, interphone communication signals are superposed on the LAN signal in the transformers 255 and 256 and the transformers 257 and 258, and separated at the transformers.

FIG. 6 is a block diagram of a sixth embodiment of the present invention. In FIG. 6, line pairs 11 and 21 which have the same impedance respectively constitute communication lines for transmitting bi-directional signals, contrary to the line pairs 10 and 20 shown in FIGS. 1 to 5, which are the communication path dedicated to transmission and receiving. LAN communication devices 321 and 324 are connected to each other through the line pair 11 and LAN communication devices 322 and 325 are connected to each other through the line pair 21. The line pairs 11 and 21 and the LAN communication devices 321 and 322 are connected to each other through transformers 355 and 356 which constitute a first superpose/separate circuit and the line pairs 11 and 21 and the LAN communication devices 324 and 325 are connected to each other through transformers 357 and 358 which constitute a second superpose/separate circuit.

A LAN communication device 323 is connected to center taps of windings of the transformers 355 and 356 on the side of the line pairs 11 and 21, and a LAN communication device 326 is connected to center taps of windings of the transformers 357 and 358 on the side opposite to the line pairs 11 and 21.

Therefore, the line pair 11 transmits LAN signals between the LAN communication devices 321 and 324 and the line pair 21 transmits LAN signals between the LAN communication devices 322 and 325, and the LAN signals transmitted between the LAN communication devices 323 and 326 are superposed and separated through the center taps of the respective transformers.

The sixth embodiment is advantageous in that a provision of communication path for the LAN signals transmitted between the LAN communication devices 323 and 326 is unnecessary.

The LAN communication device 321 may be a line concentrator for connecting LAN nodes defined by IEEE802 or terminals. It is possible to perform a telephone communication by using an exchanger and telephone set instead of the LAN communication devices 323 and 326.

In each of the embodiments shown in FIGS. 1 to 5, a single LAN line concentrator and a single LAN data terminal are connected to opposite ends of the first line pairs 10 and 20. In the sixth embodiment shown in FIG. 6, however, the two LAN communication devices 321 and 322 and the two LAN communication devices 324 and 325 are connected to the opposite ends of the first two line pairs 11 and 21, respectively. The present invention is not limited to the number of connections of the LAN communication devices or units to the line pairs. The line pairs for transmitting the LAN signal may be either uni-directional transmission paths or bi-directional transmission paths. The first or second signal transmission devices may be a signal data transmitter or receiver. Further, the LAN signal may be either a binary signal or a multi-level signal.

As described hereinbefore, the compound transmitter according to the present invention utilizes a transformer coupling and does not require any multiplexer circuit. Therefore, the compound transmitter according to the present invention is economical. Further, since there is no limitation in location in which the first and second superpose/separate circuits are provided, the freedom of design of wiring the LAN communication device and other communication devices is large.

What is claimed is:

1. A compound transmission system for compounding a LAN signal between a first LAN communication device and a second LAN communication device and a communication signal between a first signal transmission device and a second signal transmission device and transmitting the communication signal superposed on the LAN signal, comprising:

two line pairs having first and second transformers and connected to said first LAN communication device through the first transformers and connected to said second LAN communication device through the second transformers for transmitting the LAN signal;

a first superpose/separate circuit for superposing the communication signal from said first signal transmission device on the LAN signal at first intermediate level points connected to the first transformers on the side of said two line pairs, a voltage at each of the first intermediate level points being a half of a terminal voltage of the respective first transformers, and separating the communication signal from said second signal transmission device at the first intermediate level points; and a second superpose/separate circuit for superposing the communication signal from said second signal transmission device on the LAN signal at second intermediate level points connected to the second transformers on the side pair of said two line pairs, a voltage at each of the second intermediate level points being a half of a terminal voltage of the respective second transformers, and separating the communication signal from said first signal transmission device at the second intermediate level points.

2. The compound transmission system as claimed in claim 1, wherein said first superpose/separate circuit is said first transformers and the first intermediate level points are center taps of windings of said first transformers on the side of said two line pairs.

3. The compound transmission system as claimed in claim 2, wherein said second superpose/separate circuit is said second transformers and the second intermediate level points are center taps of windings of said second transformers on the side of said two line pairs.

4. The compound transmission system as claimed in claim 1, wherein at least one of said first and second superpose/separate circuits comprises a capacitor element for capacitively coupling lines of each said line pair to provide the first or second intermediate level point.

5. The compound transmission system as claimed in claim 1, wherein at least one of said first and second superpose/separate circuits comprises an inductance element for inductively coupling lines of each said line pair to provide the first or second intermediate level point.

6. The compound transmission system as claimed in claim 1, wherein said first signal transmission device is an exchanger and said second signal transmission device comprises an exchanger terminal.

7. The compound transmission system as claimed in claim 1, wherein said first and second signal transmission devices are television conference telephone devices.

8. A compound transmission system for compounding a LAN signal transmitted between a first LAN communication device and a second LAN communication device and a LAN signal transmitted between a third LAN communication device and a fourth LAN communication device and transmitting the compounded LAN signals, comprising: two line pairs having first and second transformers and connected to said first LAN communication device and said second LAN communication device through the first and second transformers for transmitting the LAN signals from said first and second LAN communication devices;

a first superpose/separate circuit for superposing the LAN signal from said third LAN communication device on said two line pairs at first intermediate level points connected to the first transformers on the side of said two line pairs, a voltage at each of the first intermediate level points being a half of a terminal voltage of the respective first transformers, and separating the LAN signal from said fourth LAN communication device at the first intermediate level points; and a second superpose/separate circuit for superposing the LAN signal from said fourth LAN communication device on said line pairs at second intermediate level points connected to the second transformers on the side of said two line pairs, a voltage at each of the second intermediate level points being a half of a terminal voltage of the respective second transformers, and separating the LAN signal from said third LAN communication device at the second intermediate level points.

9. A transmission system for compounding a LAN signal transmitted between a first LAN communication device and a second LAN communication device and a communication signal transmitted between a first signal transmission device and a second signal transmission device and transmitting compounded LAN signal and communication signal, comprising:

two line pairs connected to said first LAN communication device and said second LAN communication device through first transformers for transmitting the LAN signal;

a first superpose/separate circuit for superposing the communication signal from said first signal transmission device on said two line pairs as a common-mode component signal and separating said second LAN communication signal as the common-mode signal;

and a second superpose/separate circuit for superposing the communication signal from said second signal transmission device on said line pairs as a common-mode component and separating said first LAN communication signal as the common-mode component signal.

10. The compound transmission system as claimed in claim 1, wherein said first LAN communication device has two separate LAN communication units which are connected to said two line pairs through said first transformers, and said second LAN communication device has two separate LAN communication units which are connected to said two line pairs through said second transformers.

11. A compound transmission system for compounding a LAN signal between a first LAN communication device and a second LAN communication device and a communication signal between a signal transmission device and a signal reception device and transmitting the communication signal superposed on the LAN signal, comprising:

two line pairs having first and second transformers and connected to said first LAN communication device through the first transformers and connected to said second LAN communication device through the second transformers for transmitting the LAN signal;

a superpose circuit for superposing the communication signal from said signal transmission device on the LAN signal at first intermediate level points connected to the first transformers on the side of said two line pairs, a voltage at each of the first intermediate level points being a half of a terminal voltage of the respective first transformers; and a separate circuit for separating the communication signal of said signal transmission device at second intermediate level points connected to the second transformers on the side pair of said two line pairs, a voltage at each of the second intermediate level points being a half of a terminal voltage of the respective second transformers, and supplying the separated communication signal to said signal reception device.

* * * * *